No. 851,816. PATENTED APR. 30, 1907.
R. L. LLOYD.
ART OF CONVERTING METALS.
APPLICATION FILED AUG. 4, 1906.
4 SHEETS—SHEET 2.
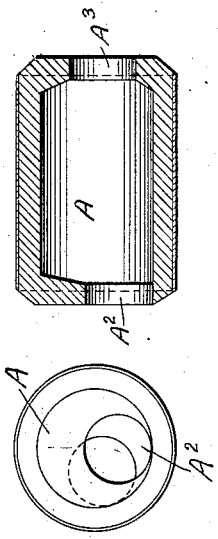
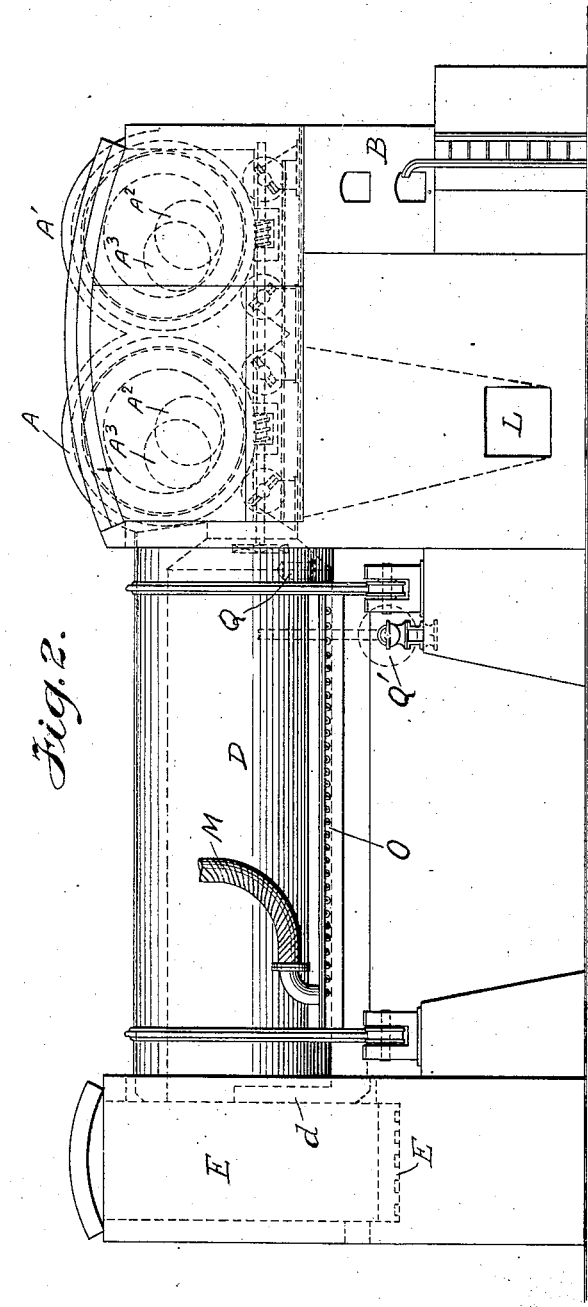
WITNESSES
INVENTOR
Richard L. Lloyd,
BY
his ATTORNEY

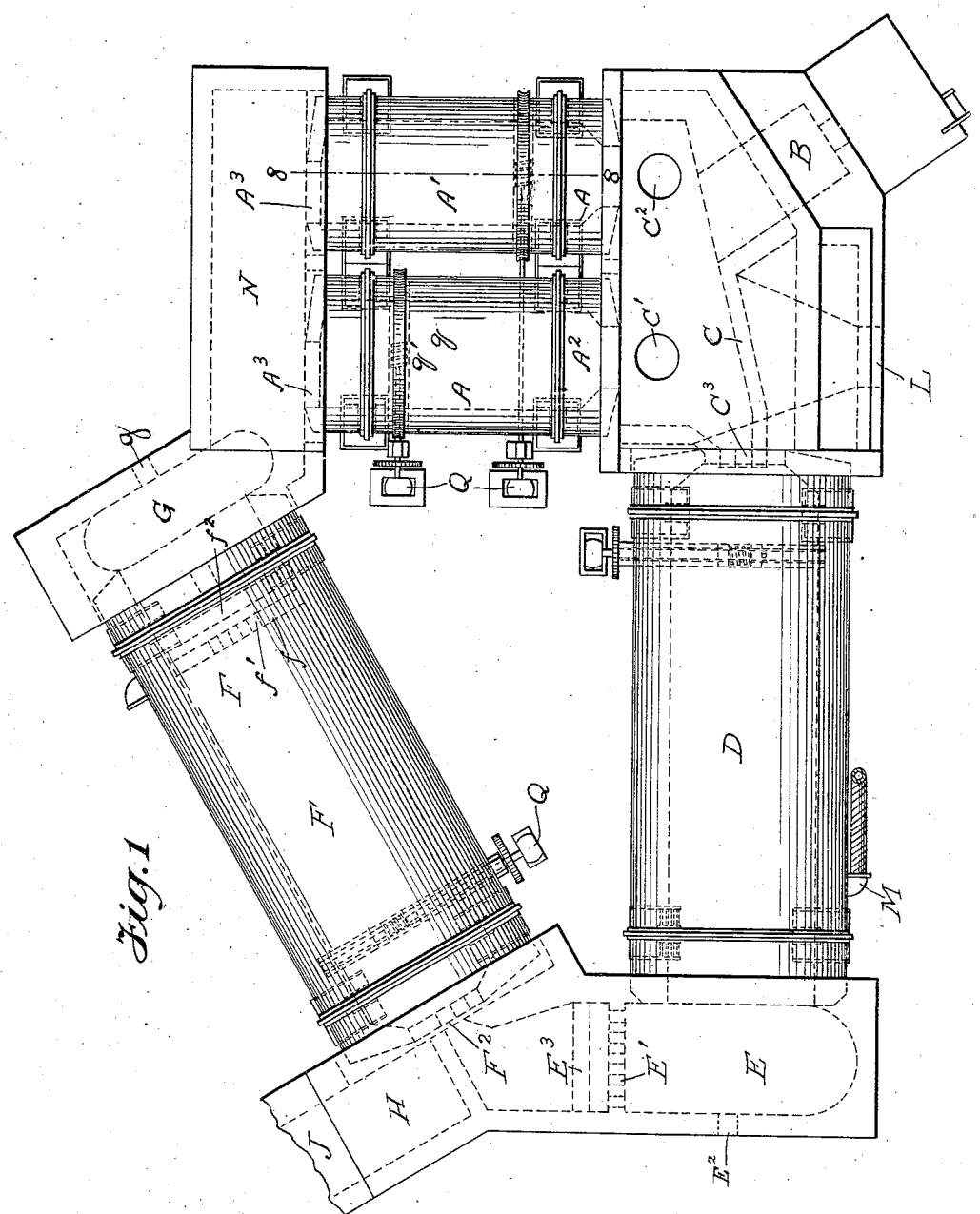

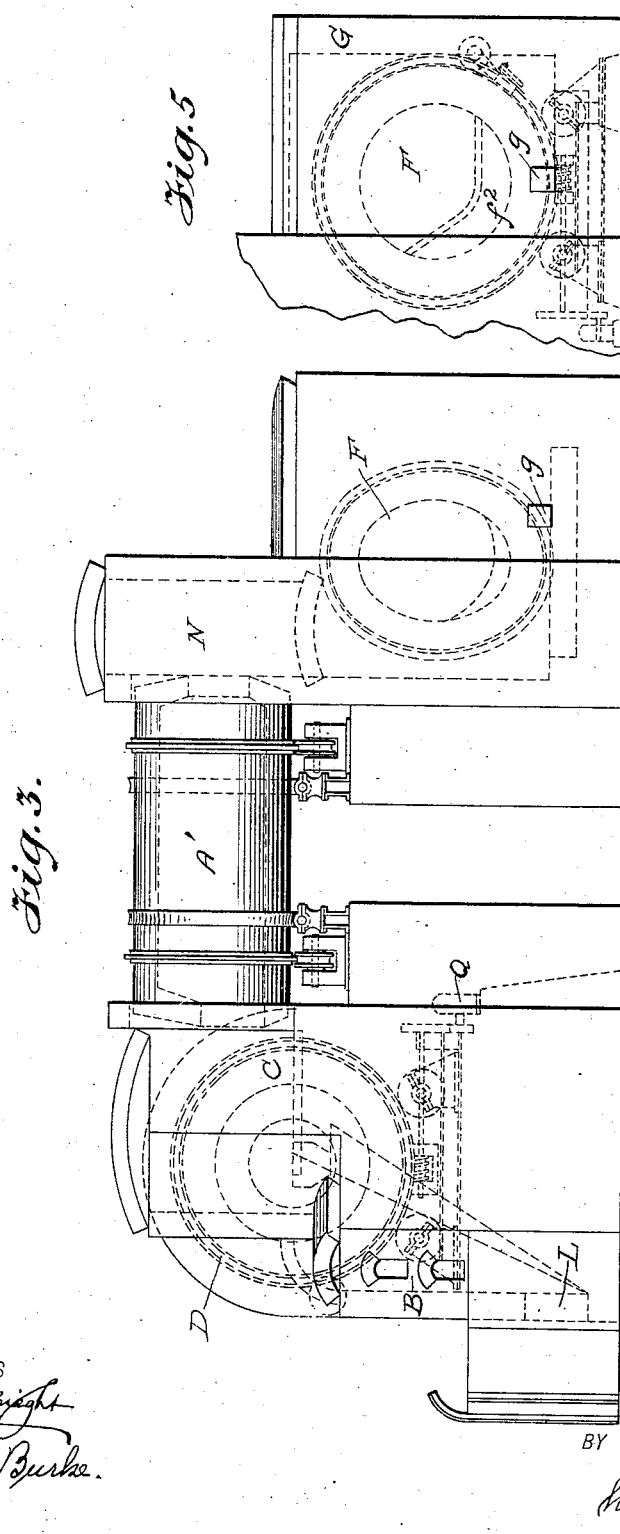

No. 851,816.  
PATENTED APR. 30, 1907.
R. L. LLOYD.  
ART OF CONVERTING METALS.  
APPLICATION FILED AUG. 4, 1906.
4 SHEETS—SHEET 4.
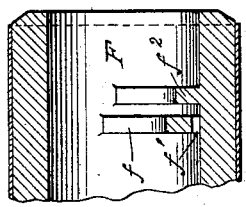
Fig. 7ª
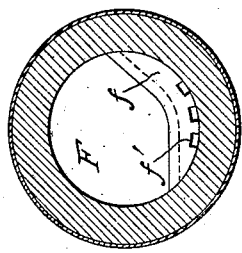
Fig. 7.
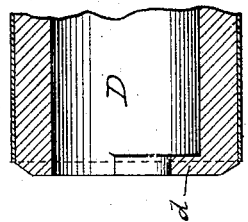
Fig. 6ª
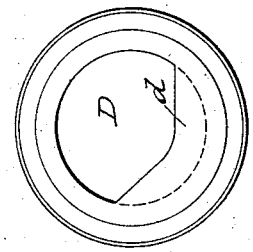
Fig. 6.
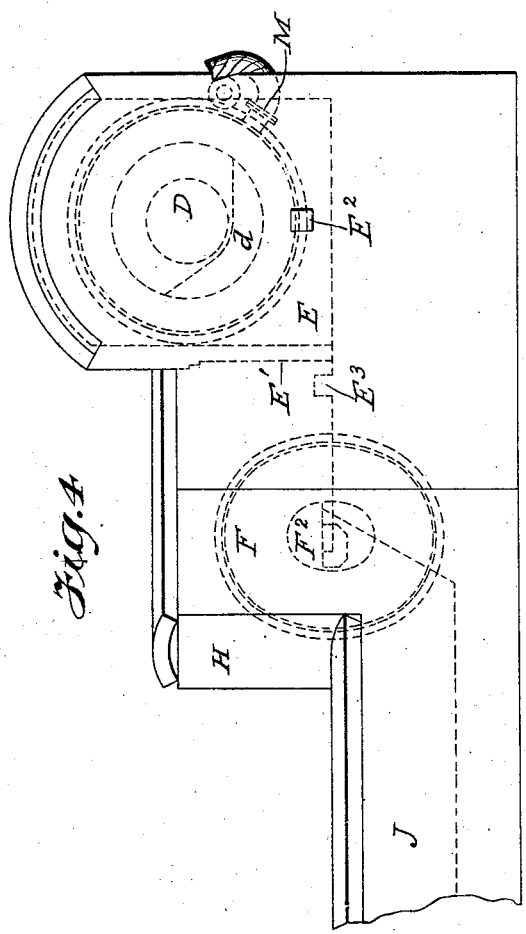
Fig. 4.
WITNESSES  
INVENTOR  
Richard L. Lloyd  
BY  
his ATTORNEY.

UNITED STATES PATENT OFFICE.

RICHARD L. LLOYD, OF CANANEA, MEXICO.

ART OF CONVERTING METALS.

No. 851,816. Specification of Letters Patent. Patented April 30, 1907.

Application filed August 4, 1906. Serial No. 329,136.

*To all whom it may concern:*

Be it known that I, RICHARD L. LLOYD, a citizen of the United States, now a resident of Cananea, Sonora, in the Republic of Mexico, have invented certain new and useful Improvements in the Art of Converting Metals, of which the following is a specification.

My present invention relates to the refining of metals, especially of copper, and has particular application to the refining of copper matte by bessemerizing.

It has for its object to cheapen the present refining processes: to increase the output of a plant designed to treat copper, ore or matte; to avoid the use of the silicious converter lining commonly employed; to effect by a continuous operation the production of copper from the ore, to blister copper or better; and a very important feature is that I am enabled to effect a considerable economy in the quantity of silicious material employed as a flux.

Under ordinary conditions, when the slag formed in the converter has combined with all of the iron present in the portion of matte under treatment, and has collected it with other metals and the silica, the slag is removed from the converter, and with whatever proportion of iron oxid or other oxidized metal it may contain is returned to the furnace to be used as a flux. In my invention, however, I maintain the slag in the converter or return it thereto until such time as its acidity, or at least its power of collecting bases, is exhausted; in other words, until it is practically saturated with the oxids. When in this condition it is much more efficacious as a flux, and a considerable economy (both in the converter and in the furnace) is secured in the use of the silicious ore, the expense of obtaining which for the reduction process is an important item in the cost of the refined copper. The results I seek may be obtained either by leaving the slag and drawing off the copper sulfid from the primary converter, recharging the latter with the copper matte from the furnace; or if the slag be also removed and upon test be found to still possess a sufficient acidity, it may be returned to the converter with a fresh charge of matte. So far as I am aware no continuous process in which the results I seek are produced has ever been in use. The mechanism which I have devised is also new with me, and it is described in this application for the purposes of rendering intelligible the art of refining copper described and claimed herein, and of illustrating a suitable form of of apparatus with which to practice the process commercially. In this regard, however, I do not desire to be confined to any particular construction, since obviously changes might be made in this without affecting the process; but I do not in this application claim the apparatus, as it is described and claimed in my pending application, Serial Number 329,137 filed August 4th, 1906.

In the art of refining copper the common practice is to smelt the ore in a suitable reverberatory or blast furnace with a proper flux, after which the resultant matte is delivered to converters. Into these a silicious material of some suitable description is ordinarily introduced, usually as a tamped lining, for the purpose of combining with the basic contents of the converter to form a slag; the bases in the slag are formed by the oxidation of the metals other than copper, iron being the principal one, by the blast of air which passes through the twyers, the sulfur which is commonly present with copper and iron being oxidized and escaping in the blast. Sometimes silicious ore is introduced into the converter, to partially protect the lining and increase its life by furnishing a part, at least, of the desired flux; and it has also been proposed to furnish the silica necessary by blowing it in through the twyers, and in other ways. The matte contains in the main, copper, iron, and sulfur, with smaller amounts of other materials. Air is blown through the molten bath in the converter and the oxygen acts upon it, the iron and sulfur being oxidized first, and the copper last; the sulfur being combined, escapes as sulfurous acid, while the iron is oxidized and combines with the silica and alumina, either in the lining of the converter or otherwise introduced, and forms a slag, which is generally removed when all of the iron is oxidized; the combinations thus described are the principal sources of heat. Owing to the fact that sulfur has a greater affinity for copper than for iron, after all the iron has been oxidized and collected by the slag and after the removal of the slag, there remains in the converter molten copper sulfid, which though never pure, is nearly so. This is the first stage of the common procedure and is complete when the iron is all collected by the slag, which in these processes must then be removed, or it will foam over and cause trouble.

After the slag is removed the second stage of the operation begins. This consists in blowing air through the molten contents of the converter, consisting practically of copper sulfid, which is thus oxidized, the sulfur escaping as before in the form of sulfurous acid ($SO_2$), and the copper being oxidized to the first oxid, CuO. As soon as any of the oxid is formed it reacts with the copper sulfid as follows:

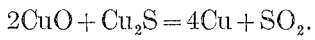
$$2CuO + Cu_2S = 4Cu + SO_2.$$

This continues until the sulfur has been expelled and the copper remains as metal. The reactions above described take place in all forms of copper reduction. In these older processes the slag is removed as soon as the iron and other metals are all combined or "slagged," and while it is still acid or capable of collecting bases; in other words, the condition of the copper under treatment has determined the time of the removal of the slag without regard to the economical use of the silicious ore or other acid supply.

In the improved process of my invention I employ the slag so long as it is capable of collecting bases, and thus I am enabled to fit it for use as a fluxing agent in the furnace to a greater degree than has been possible heretofore; not only is this more efficacious in the furnace, but in the converter it requires less of the silicious ore commonly employed as flux, since this is used to better advantage, and thus requires the handling of less material; in many cases the silicious ore must be imported to enable the operations to be carried on, and it is always a source of substantial expense, however procured.

The process which I have devised is essentially as follows; it being understood that the steps which I suggest are typical and that I do not wish to be confined to the precise details here set out, being free to vary in many particulars according to the best practice for the particular ore under treatment, as will be understood.

The copper matte, containing any desired percentage of copper and the usual impurities, is delivered from the furnace to a feeding barrel, communicating with a primary converter, the blast from which passes through the feeding barrel and maintains the matte molten; from a second feeding barrel a suitable slag, still unsatisfied as to bases, is also fed into the converter in proportions suited to the ore being treated, the blast from the converter also passing through this feeding barrel and maintaining the slag fluid. I may desire to start the operation with a dry flux or under some circumstances to supply additional silica, and then the materials in the two barrels may be brought to proper temperature by an extraneous fire until the process is in full operation, after which the heat of oxidation in the primary converter suffices. The slag and the matte may pass continuously from the barrels into the primary converter and a blast of air is forced through the melted materials, oxidizing them as already explained, the slag continuing to collect the iron and other impurities until its acidity is exhausted. A dam at the delivery end of the primary converter separates the melted copper sulfid from the slag and permits the latter, when it has remained a suitable time, to overflow into a proper receptacle from which it may be removed as desired for use as a flux in the furnace, for which purpose it is well adapted by reason of its high content of iron oxid. The copper sulfid proceeds into a secondary converter, where it is blown, as already explained, until the copper is of the desired grade; a siphon dam at the delivery end of the secondary converter separates the copper sulfid from the copper, which is of greater specific gravity. Preferably the copper is delivered into a hearth where it may be poled or otherwise further refined, as may be desired.

The best method of operating my improved process is to continuously feed to the primary converter matte from the furnace and acid slag in proportions best suited to the particular material under treatment, which necessarily depends upon its specific composition; but it is within my invention to supply the necessary materials in consecutive charges, either simultaneously or alternately. In general it will not be found necessary to shut down the converters except at long intervals, since they may be lined with a suitable magnesite or other lining, which is not subject to any material deterioration except from attrition. The removal of the slag when it is loaded may be intermittent, or by a little practice with the particular ores to be treated may be practically continuous; while by the construction of the converter which I have devised, the flow of copper sulfid from the first to the second converter may be made substantially continuous, as may also be the flow of metallic copper from the second converter into the hearth. So far as I am aware this has not heretofore been accomplished.

In the drawings, Figure 1 is a plan of an arrangement of converter and other apparatus by which the inventon may be practiced; Figs. 2 to 5, are respectively elevations of the different sides of the apparatus shown in Fig. 1; Figs. 6 to 8ª are details.

Referring now to Figs. 1 to 5, A—A¹ are feeding barrels which are operated by motors Q Q and may be turned when desired at desired speed, preferably low. In the barrel A (for example) is charged the copper matte from a suitable furnace of any desired type, while into the barrel $A^1$ is charged the slag or flux. At B is shown a furnace which, as already indicated, may be used in the initial operation of the plant to heat the materials and start the process. C is a hearth communicating with the feeding barrels, and D is the first or primary converter communicating with hearth C and receiving from it by the spout $C^3$ the matte and slag or flux as these are discharged across the hearth from the feeding barrels. In this converter D is carried on the first part of the process already outlined above; the copper matte being fused and blown, the sulfur escapes as it combines with the oxygen in the blast, generating in conjunction with the oxidation of the iron an intense heat. The blast also oxidizes the iron and other impurities which are collected in the slag, the copper sulfids settling to the bottom of the converter. The twyers are preferably connected to the source of air pressure by a suitable flexible pipe M, so that the converter may be rotated at desired times by its motor $Q^1$, still keeping the blast upon the twyers until they come above the line of the materials in the converter.

By referring to Figs. 6 and $6^a$, it will be seen that a dam $d$ is formed across the mouth of the converter, by which a receptacle is provided for the copper sulfid which forms in the converter; by the rotation of the converter the dam is withdrawn and the entire contents may be discharged.

From the converter D, the slag and copper sulfid are discharged into the hearth E (see Figs. 1, 2 and 4). A siphon dam, consisting of the wall $E^1$ with perforations at its bottom, and an abutment $E^3$ higher than the perforations and beyond them, forms the outlet from the hearth E; while an opening $E^2$, a little higher than the abutment $E^3$, forms a slag outlet, the operation of the arrangement being such as to completely separate the copper sulfid from the slag. If the acidity of the slag be exhausted it may be at once returned to the furnace for use as a flux or otherwise disposed of, while if it is still acid it may be returned to the converter D through one of the openings $C^1$, $C^2$, in the hearth C. The copper sulfid passes by a suitable spout $F^2$ into the second converter F, where it is again subjected to blast and the remaining sulfur blown out of it. At the exit end of the second converter (see Figs. 1 and 5) is a siphon dam formed of the wall $f$; having the perforations $f^1$, and the wall $f^2$; see also Figs. 7 and $7^a$. The copper being heavier than the copper sulfid sinks and passes through the perforations $f^1$ and over the wall $f^2$, while the copper sulfid is kept in the converter until the sulfur has been completely oxidized and driven off. From the converter F, the copper passes into the hearth G, where it may be poled or otherwise further refined. The hearth E is impervious to the blast, which proceeds from the converter D through the feeding barrels A, $A^1$, the flue N, and the hearth G, (which is the coolest point in the operation), into the converter F the flue H, to the flue J, and thence to the stack, not illustrated. The remaining heat in the blast may be utilized if desired to heat boilers or otherwise, or acid chambers may be located in the flue, but since these form no part of my invention, they are not illustrated or described.

The converter F may, when desired, be rotated by its motor $Q^2$, and be emptied for repairs or otherwise, as will be obvious by inspecting Figs. 7 and $7^a$.

Figs. 8 and $8^a$ illustrate the construction of the feeding barrels A, $A^1$; materials are introduced unto them through the openings $C^1$ $C^2$ in the hearth C from time to time, by any desirable means, and are there melted by the heat of the blast passing from the converter D; they then flow out through the openings $A^2$ of the barrels, when they are brought down to the bottom; the opening being turned to the top to receive the discharge of the hopper or spout. The opening $A^3$ is provided to afford a passage for the blast.

The various parts of the apparatus subject to attack in the reactions inherent in the process are lined with a suitable non-corroding, preferably non-silicious substance, such as chromite or magnesite or something similar, which is not readily attacked and destroyed; in some places silicious plain brick with a non-corroding protective coating may be employed.

The term "neutral" as herein used in connection with the slag is to be understood as a normal or saturated silicate, that is, one in which the acid constituent of the slag or flux is combined and fully and completely saturated or satisfied with the available oxids and bases of the matte.

Obviously in the commercial practice of the invention complete saturation may not be always attained, yet the benefit of my improvement may be present to a greater or less degree; if the complete or substantially complete utilization of the acid-carrying material is obtained, so that there is no unnecessary waste thereof, as distinguished from former practices in the art in which the slag was removed while still unsatisfied, I consider my process to be employed.

Having thus described my invention, what I claim and wish to protect by Letters Patent of the United States is:—

1. The improvement in the art of converting copper matte, which consists in blowing the matte with an acid slag until the capacity of the slag for collecting bases is exhausted, or substantially exhausted.

2. The improvement in the art of converting copper matte, which consists in feeding molten matte and flux into a converter, blowing the melt until copper sulfid is formed, removing the copper sulfid and adding matte until the slag becomes substantially neutral, removing the slag and feeding additional flux or slag unsatisfied as to bases, and so on continuously.

3. The improvement in the art of converting copper matte, which consists in blowing molten matte and acid slag in a converter, removing the copper sulfid as desired and removing the slag as it becomes neutral or satisfied.

4. The improvement in the art of converting copper matte, which consists in blowing molten matte and acid slag in a converter, removing the copper sulfid as it forms and replacing it with fresh matte until the slag becomes basic, substituting an acid slag or flux for that which has been neutralized, and so on continuously.

5. The improvement in the art of converting copper matte, which consists in blowing the molten matte with an acid slag, removing the copper sulfid as it forms and replacing it with fresh matte until the slag becomes neutral, then removing the slag and replacing it with an acid carrier, further blowing the charge and finally blowing the removed copper sulfid.

6. In the art of converting copper matte, the process of feeding molten matte and flux into a converter, blowing the charge until the bases of all foreign metals have combined with the flux, removing the copper sulfid, then adding matte to the resulting slag until the latter becomes saturated or substantially neutral, removing the neutral slag and feeding additional unsaturated charges of flux to the matte and so on continuously.

7. In the art of converting copper matte, the process of blowing molten matte and flux to effect combination between the bases of the foreign metals and said flux to the point of saturation, and then removing the copper sulfid.

8. In the art of converting copper matte, the process of blowing molten matte and flux to effect separation of the copper sulfid, removing the copper sulfid, and adding fresh charges of matte until the resulting slag is neutralized or saturated.

9. In the art of converting copper matte, the process of blowing molten matte and slag to effect separation of the copper sulfid, removing the copper sulfid and adding fresh charges of matte until the slag is saturated as to its basic contents.

10. In the art of converting copper matte, the process of blowing molten matte and flux to effect combination between the bases of the foreign metals and said flux to the point of saturation, and removing the copper sulfid until such point of saturation is reached.

11. In the art of converting copper matte, the process of blowing molten matte and slag, removing the separated copper sulfid, and adding fresh charges of matte until the slag becomes saturated or ceases to combine with the bases of the metals foreign to the copper.

12. In the art of converting copper matte, the process of blowing molten matte and slag, removing the separated copper sulfid, adding fresh charges of matte until the slag ceases to combine with the bases of the metals foreign to the copper, then removing the slag thus saturated and replacing it with an acid carrier, further blowing the charge and finally blowing the removed copper sulfid.

13. In the art of converting copper matte, the process of blowing a charge of matte with an admixture of acid flux, removing the copper sulfid thus formed, and adding fresh charges of matte to the resulting slag until its acid constituent has combined with the available bases of such added charge.

14. In the art of converting copper matte, the process of blowing a charge of matte with an admixture of acid slag, removing the copper sulfid thus formed, and continuing the addition of fresh charges of matte to the point of saturation of the slag by the available bases of the added charges.

In witness whereof I have hereunto set my hand this 26th day of July 1906, in the presence of two witnesses.

RICHARD L. LLOYD.

Witnesses:
J. T. WILKEY,
W. B. PRICE.